United States Patent Office 3,247,998
Patented Apr. 26, 1966

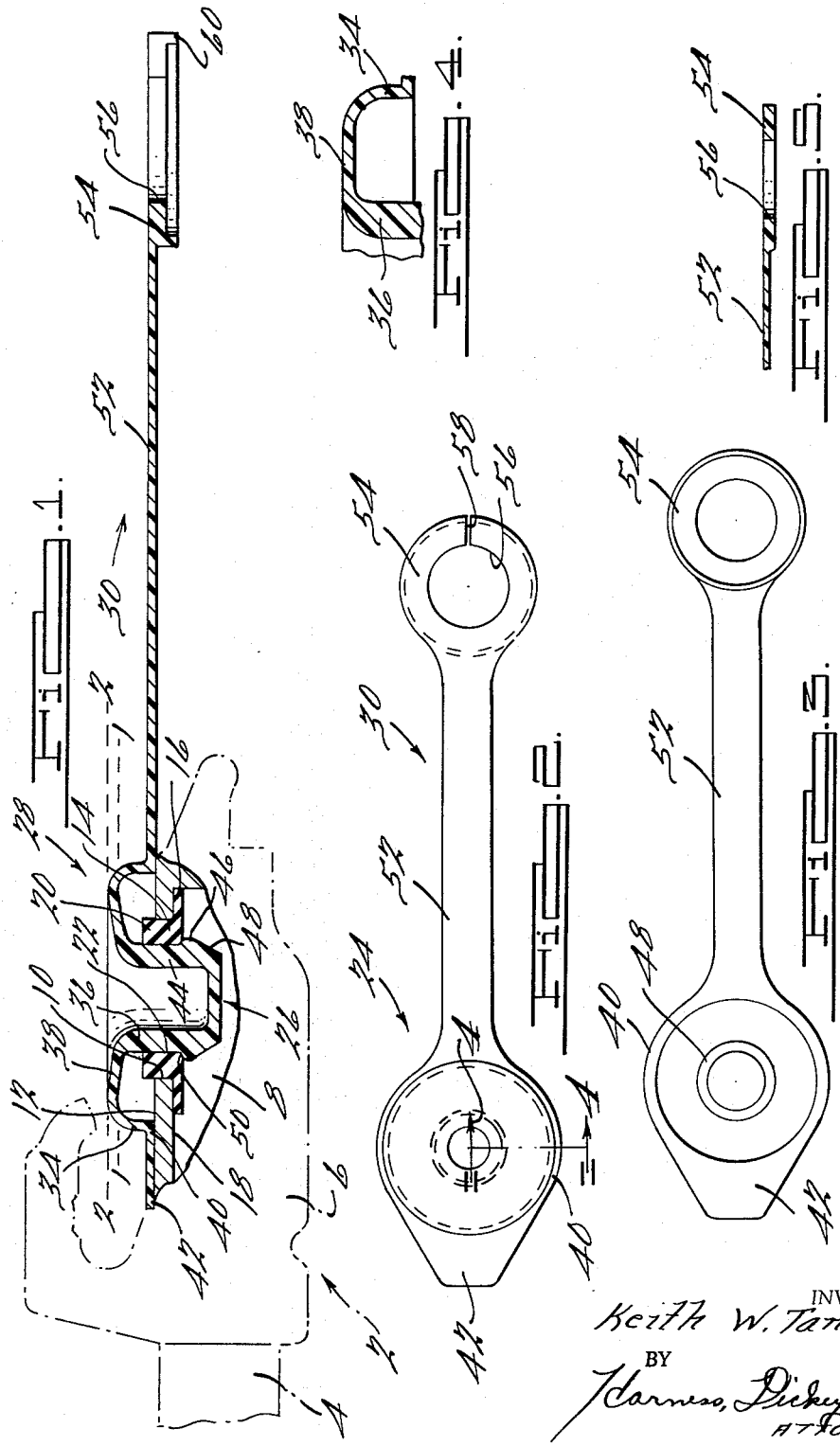

3,247,998
FITTING PLUG
Keith W. Tantlinger, Grosse Pointe Shores, Mich., assignor to Fruehauf Corporation, Detroit, Mich., a corporation of Michigan
Filed Dec. 17, 1963, Ser. No. 331,216
1 Claim. (Cl. 220—60)

This invention relates generally to closures and more particularly to an improved plug-type fitting cover for the exposed openings of service and emergency pneumatic brake line connectors of heavy duty tractor-trailers and the like while they are not in use.

The increased use of trailers and shipping containers that are transported apart from a tractor on, for example, rail cars, has emphasized the need for an improved fitting plug for closing the gladhand connections of the containers. When such trailers and containers are shipped without the tractors, the gladhand connections are exposed to snow, dirt, railroad cinders, sea splash and other deleterious elements. Obviously, infiltration of foreign matter into the open brake line connectors renders the brakes susceptible to malfunction when the gladhands are reconnected and the units put back in use.

Closures presently known and used are generally unsatisfactory since they often do not properly contact the metal surface immediately adjacent the gladhand. This latter deficiency allows water and other foreign matter to settle between the closure and the gladhand.

A plug-type gladhand closure in accordance with the instant invention is particularly well suited to the solution of the aforementioned problem in that it provides an extremely efficient seal between the closure and the gladhand surface surrounding the opening in the gladhand.

Accordingly, one object of the present invention is an improved closure.

Another object of the invention is an improved closure for connector openings of the pneumatic brake lines on trucks, trailers and the like.

Another object is an improved closure for a gladhand connector that is easily applied, removed, and is reliable in operation.

Another object is to provide an improved gladhand closure that provides simple out-of-use attachment and anti-loss features.

Another object is to provide an improved gladhand closure that is durable in construction and inexpensive to manufacture.

Other objects, advantages and capabilities of the invention will become apparent from the following description taken in conjunction with the accompanying drawings showing only a preferred embodiment of the invention.

In the drawings:

FIGURE 1 is an elevation view of the improved closure in section and a trailer gladhand shown partially in phantom and partially broken away;

FIG. 2 is a plan view of the top of the improved closure member;

FIG. 3 is a plan view of the bottom of the improved closure member of FIGURE 1 but without a slot formed in the end of the member;

FIG. 4 is a cross-sectional view taken substantially aolng the line 4—4 of FIGURE 2 showing the closure in the relaxed state; and FIG. 5 is a cross-sectional view of a modified form of the end of the closure member shown in FIGURE 3.

Referring now to FIGURES 1 to 3 of the drawing, there is illustrated partially in phantom and partially in section, a pneumatic brake line connector or gladhand 2 for a trailer pneumatic brake line, illustrated as disconnected from a mating gladhand (not shown) attached to a tractor. The gladhand 2 is attached in a manner known in the art to a pneumatic brake line 4 which delivers the pneumatic pressure for operating the brakes of the trailer. Formed in a main body 6 of the gladhand is a central cavity 8 in pneumatic communication with the brake line 4. Formed in the upper portion of the body 6 is an aperture 10 leading from the cavity 8 to an outer planar sealing surface 12 of the gladhand 2, the cavity 8, aperture 10 and sealing surface 12 forming the entrance to the trailer brake line. Contained in the aperture 10 is a sealing grommet 14 of rubber or other resilient material forming a constricted bore 22 for the aperture 10. The grommet 14 is formed with a radially outwardly extending flange portion 16 bearing against an upper surface 18 of the body cavity 8 and a hollow cylindrical portion 20 bearing against the circumference of the aperture 10. Cooperating with the bore 22 formed by the grommet 14 and the sealing surface 12 of the gladhand 2 is a closure member 24 for sealing the exposed opening of the brake line. The closure member 24 is formed of a plug portion 26 received in the bore 10, an annular diaphragm portion 28 which co-operates with the sealing surface 12 of the gladhand 2 and a strap portion 30 adapted to be attached to the pneumatic line 4 to prevent loss of the closure member 24 while it is not in use.

The diaphragm portion 28 of the closure member 24 is formed as an annular shaped umbrella having two radially spaced concentric cylindrical legs 34, 36, joined at the upper ends thereof by a radially extending shield 38 which operates to protect the sealing surface 12 from the aforementioned ice formation and resiliently operates to retain the closure in position in a manner to be hereinafter explained. Radially extending from the lower end of the outer leg 34 is a sealing lip portion 40 which co-operates with the planar sealing surface 12 of the gladhand 2 to provide the necessary seal between the closure member 24 and the sealing surface 12. The sealing flange 40 is provided with an extension 42 thereon which acts as a release tab which, when pulled upward, will release the plug portion 26 from the grommet 14, thereby enabling the plug 26 to be extracted from the bore 22 of the grommet.

The plug portion of the closure member 24 is formed as an axial extension of the inner leg 36 of the cap portion 32 and includes a cylindrical portion or shank 44, which mates with the bore 22 of the grommet 14 and an enlarged inner end portion or annular flange 46 which extends radially outwardly from the shank 44. The flange 46 is formed by a camming surface 48 at the lower portion of the flange 46 which serves to facilitate insertion of the plug 26 into the bore 22 and a holding shoulder 50 at the upper portion of the flange 46 which cooperates with the grommet 14 to retain the plug 46 in the bore 22.

Longitudinally extending from the opposite side of the diaphragm portion 28 from the release tab 42 is the strap portion 30 which is formed with a longitudinally extending web 52 and a supporting ring 54. The strap portion 30 is shown in FIGURE 1 as horizontally extending from the diaphragm 28. However, when the device is in use the web 52 is normally bent around the bottom of the gladhand 2 and the supporting ring 54 is positioned around the pneumatic line 4, thereby preventing loss of the closure 24 from the trailer.

The supporting ring 54 is adapted to be fitted around a pneumatic line 4 and is accomplished on original equipment by insertion of the ring 54 thereon prior to fixing the gladhand 2 to the pneumatic line 4. The closure for this use is illustrated in FIGURE 3. If the device is to be used on existing equipment, a slot 58 (shown in FIGURE 2) is formed in the annular ring 54 thereby permitting the insertion of the ring 54 on the line 4 by deforming the ring 54. Also formed on the supporting ring is a lip 60 used for identificaiton purposes. The closure member to be used on the emergency line (such as brake line 4) is provided with a lip 60 as shown in FIGURE 2 and the closure member for use on the service line is provided without the lip or is flat, as shown in FIGURE 5. In this manner the various closure members may be associated with the proper pneumatic line by merely discovering whether the closure member has a lip or not.

FIGURE 4 is a view illustrating the closure member 24 of FIGURE 1 in a relaxed state. It will be noted that in FIGURE 1, the diaphragm portion 28 is shown as deformed in the sense that the plane of the upper extremity of the leg 36 of the diaphragm 28 (illustrated as dotted line 1—1) is axially inwardly spaced from the same plane on the outer leg 34 of the diaphragm 28 (illustrated as dotted line 2—2). This deformation is for the purpose of resiliently retaining the closure in position by utilizing the forces produced in the diaphragm.

When it is desired to close the entrance to the pneumatic line 4 of a trailer while it is not in use, the plug portion 26 of the closure member 24 is inserted into the bore 22 of the grommet 14 and a downward pressure is applied to the area of the closure immediately above the plug 26 or directly over the inner leg 36 of the diaphragm 38, thereby forcing the plug 26 into the bore 22. The camming surface 48 of the plug 26 will act to compress the cylindrical portion 20 of the grommet to facilitate the introduction of the flange portion 46 of the plug 26 into cavity 8. The flange 46 is forced into the cavity 8 a sufficient distance as to extend the holding shoulder 50 downwardly beyond the flange portion 16 of the grommet 14. The closure 24 is then released and the plug flange 46 will retract itself until the holding shoulder 50 is engaged by the flange portion 16 of the grommet 14. This engagement retains the flange 46 in the cavity 8 and prevents the diaphragm portion 28 of the closure member 24 from returning to the relaxed state shown in FIGURE 4. This deformation sets up two axial forces, one of which is applied to the plug flange 46 maintaining a tight seal between the flange 46 and the grommet 14 and the second force is applied between the sealing lip 40 of the diaphragm 28 and the flat surface 12 of the gladhand 2. Both seals effectively prevent the entry of any foreign material either on the flat surface 12 of the gladhand 2 or into the cavity 8 and thus into the pneumatic line 4 itself.

While I have particularly shown and described one particular embodiment of the invention, it is distinctly understood the invention is not limited thereto but that modifications may be made in the scope of the invention and such variations as are covered by the scope of the appended claim. For example, the grommet 14 may be eliminated and the plug inserted directly into the aperture 10.

I claim:

A closure for a pneumatic brake line gladhand having a central cavity, a constricted circular bore communicating the cavity, and a radially extending sealing surface adjacent the outer periphery of the bore therein, said closure comprising:
  a generally cylindrical plug portion receivable in the bore of said gladhand, said plug portion having
  an enlarged inner end portion releasably engageable with the periphery of the inner end of the bore to restrain said plug portion from movement axially outwardly thereof, said closure having
  a resilient diaphragm portion connected to and extending radially outwardly from said plug portion,
  and an annular radially extending sealing lip on the radially outer periphery of said diaphragm portion, said diaphragm portion being deflectable upon insertion of said plug portion into the bore of said gladhand to concomitantly urge the sealing lip of said closure in one direction into engagement with the radial sealing surface on said gladhand and to urge the inner end portion of said plug portion in the opposite direction into engagement with the inner peripheral edge of the bore in said gladhand, respectively.

References Cited by the Examiner

UNITED STATES PATENTS 3,021,976  2/1962  Tracy _____ 220—60
3,106,311  10/1963  Fairchild _____ 220—60
3,147,824  9/1964  Henderson _____ 220—38.5

THERON E. CONDON, *Primary Examiner.*

G. T. HALL, *Assistant Examiner.*